(12) United States Patent
Ito

(10) Patent No.: US 9,587,774 B2
(45) Date of Patent: Mar. 7, 2017

(54) CONNECTOR FOR FLUID PRESSURE DEVICES

(75) Inventor: Shinichi Ito, Toride (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 415 days.

(21) Appl. No.: 12/598,773

(22) PCT Filed: Mar. 5, 2008

(86) PCT No.: PCT/JP2008/054419
§ 371 (c)(1),
(2), (4) Date: Nov. 4, 2009

(87) PCT Pub. No.: WO2008/142898
PCT Pub. Date: Nov. 27, 2008

(65) Prior Publication Data
US 2010/0140921 A1   Jun. 10, 2010

(30) Foreign Application Priority Data
May 21, 2007   (JP) .................................. 2007-134252

(51) Int. Cl.
*F16L 15/08*   (2006.01)
*F16L 23/032*   (2006.01)

(52) U.S. Cl.
CPC .............. *F16L 15/08* (2013.01); *F16L 23/032* (2013.01)

(58) Field of Classification Search
CPC ................................ F16L 23/032; F16L 15/08
USPC ............. 285/325–327, 367, 219, 220, 124.5; 403/331, 336, 335, 338
See application file for complete search history.

(56) References Cited

U.S. PATENT DOCUMENTS

| | | | |
|---|---|---|---|
| 2,945,560 A * | 7/1960 | Malec | ....................... F16N 7/34 138/46 |
| 3,638,906 A * | 2/1972 | Yano | ............................. 251/145 |
| 3,741,236 A | 6/1973 | Pass et al. | |

(Continued)

FOREIGN PATENT DOCUMENTS

| CA | 2 311 055 A1 | 1/2001 |
|---|---|---|
| CN | 1682065 A | 10/2005 |

(Continued)

OTHER PUBLICATIONS

Office Action issued Dec. 29, 2010, in Chinese Patent Application No. 200880016766.1 with English translation.

(Continued)

*Primary Examiner* — David E Sosnowski
*Assistant Examiner* — James Linford
(74) *Attorney, Agent, or Firm* — Oblon, McClelland, Maier & Neustadt, L.L.P.

(57) ABSTRACT

An adapter includes a base body including a pair of coupling members and a connecting plug inserted through a hole in the base body and screw-engaged with a port of the two-way valve. In addition, upon threaded engagement of the connecting plug, the base body is mounted with respect to an attachment surface of the two-way valve. Further, a seal member is installed on an end surface of the base body, such that a sealing function is performed by abutment of the seal member against the attachment surface. Moreover, first and second connecting flanges of a connecting apparatus are engaged with respect to the coupling members of the adapter.

1 Claim, 20 Drawing Sheets

(56) References Cited

U.S. PATENT DOCUMENTS

| | | | |
|---|---|---|---|
| 3,820,825 A | 6/1974 | Morin | |
| 3,841,667 A * | 10/1974 | Sands | 285/39 |
| 3,945,465 A * | 3/1976 | Vander Horst et al. | 184/6.24 |
| 4,352,511 A * | 10/1982 | Ribble et al. | 285/91 |
| 4,672,728 A * | 6/1987 | Nimberger | 29/890.142 |
| 5,000,488 A * | 3/1991 | Albrecht | 285/12 |
| 5,141,262 A * | 8/1992 | Bartholomew | 285/187 |
| 5,383,689 A | 1/1995 | Wolfe, Sr. | |
| 5,403,042 A * | 4/1995 | Negron | 285/12 |
| 6,583,357 B2 | 6/2003 | Rubenstein et al. | |
| 6,913,115 B2 | 7/2005 | Tomita et al. | |
| D543,259 S * | 5/2007 | Chueh et al. | D23/262 |
| 7,354,075 B2 | 4/2008 | Hagen | |
| 2008/0087331 A1 | 4/2008 | Kaitsuka | |

FOREIGN PATENT DOCUMENTS

| | | |
|---|---|---|
| DE | 1 948 493 | 4/1971 |
| DE | 94 22 466 U1 | 3/2003 |
| GB | 666 183 | 2/1952 |
| JP | 47-9063 | 5/1972 |
| JP | 52-32011 | 3/1977 |
| JP | 54-111799 | 8/1979 |
| JP | 59-107396 | 7/1984 |
| JP | 61-36868 | 10/1986 |
| JP | 2001-90722 | 4/2001 |
| JP | 2003-21118 | 1/2003 |
| JP | 2003-143740 | 5/2003 |
| JP | 3851119 | 9/2006 |
| JP | 2008 95818 | 4/2008 |
| WO | WO 2004029499 A1 * 4/2004 | F16L 41/10 |

OTHER PUBLICATIONS

Japanese Office Action issued Nov. 8, 2011, in Patent Application No. 2007-134252 (with English-language translation).

Japanese Office Action with English translation mailed Jul. 3, 2012, in Japanese Patent Application No. 2007-134252, filed May 21, 2007.

German Office Action issued Jul. 31, 2013, in German Patent application No. 11 2008 001 364.0.

* cited by examiner

CONNECTOR FOR FLUID PRESSURE DEVICES

TECHNICAL FIELD

The present invention relates to a connector for fluid pressure devices, which is utilized when the fluid passages between multiple fluid pressure devices are made to communicate with each other, by interconnecting a plurality of such fluid pressure devices through a connecting apparatus.

BACKGROUND ART

As disclosed in the specification of Japanese Patent No. 3851119, the present applicants have proposed a connecting apparatus for fluid pressure devices, in which the same or different types of fluid pressure devices, such as filters, regulators, lubricators, solenoid valves, and the like, which are used in a pneumatic circuit, are connected together in series, and which is capable of placing fluid passages between multiple fluid pressure devices in communication with each other.

The connecting apparatus comprises a body having a hole therein, a retaining bracket connected to one end surface of the body and having a first engaging portion that engages with projections disposed respectively on both of one fluid pressure device and another fluid pressure device, and a latching member mounted on the other end surface of the body and having a second engaging portion which engages with projections disposed respectively on the one and the other fluid pressure devices. The latching member is disposed tiltably with respect to the body, wherein by tilting the latching member and causing engagement of the projections respectively with the first and second engaging portions on the retaining bracket and the latching member, the fluid pressure devices are connected together integrally by the connecting apparatus, through the retaining bracket and the latching member.

Incidentally, in the aforementioned conventional technique, a structure is provided that enables mutual connection, by means of engagement of the first and second engaging portions of the connecting apparatus with projections of the fluid pressure devices. As a result, fluid pressure devices, which are not equipped with these types of projections thereon, cannot be connected by means of the connecting apparatus. Thus, there has been a demand for an apparatus that is capable of connecting together fluid pressure devices easily and reliably, irrespective of whether such projections are provided or not.

DISCLOSURE OF INVENTION

A general object of the present invention is to provide a connector for fluid pressure devices, which is capable of easily and reliably connecting respective fluid pressure devices together through a connecting apparatus, and by means of a simple structure.

The above and other objects features and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
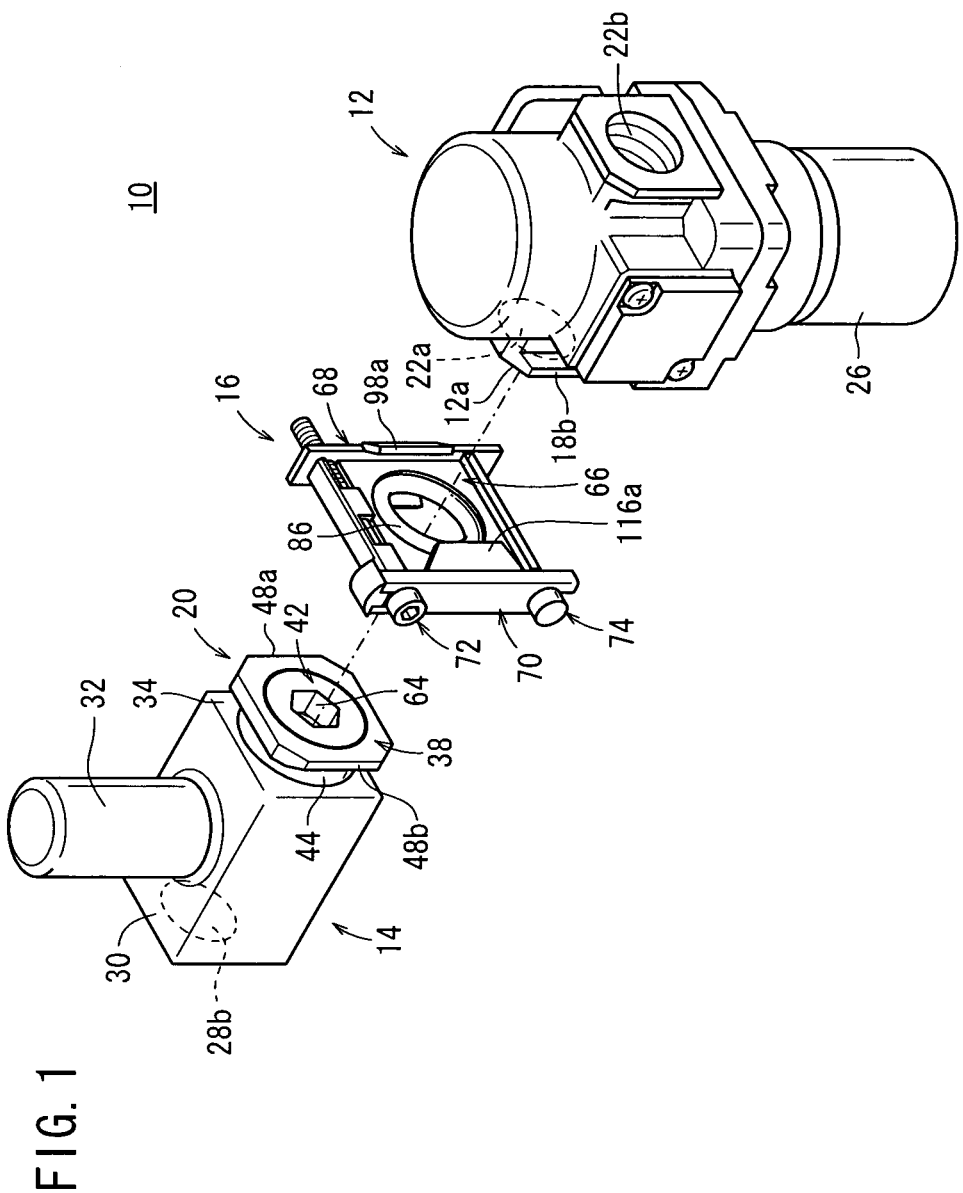
FIG. 1 is an exploded perspective view of a fluid pressure unit to which an adapter of a fluid pressure device according to a first embodiment of the present invention is applied.

In FIG. 1, reference numeral 10 indicates a fluid pressure unit on which the connector for fluid pressure devices according to an embodiment of the present invention is mounted, and wherein the fluid pressure devices are connected mutually together by a connecting apparatus through the connector. Herein, an explanation shall be given of a case in which a regulator (fluid pressure device), which reduces the pressure of a supplied pressure fluid, and a two-way valve (fluid pressure device), which is capable of switching between flow states of the pressure fluid, are connected together.

Figure 2:
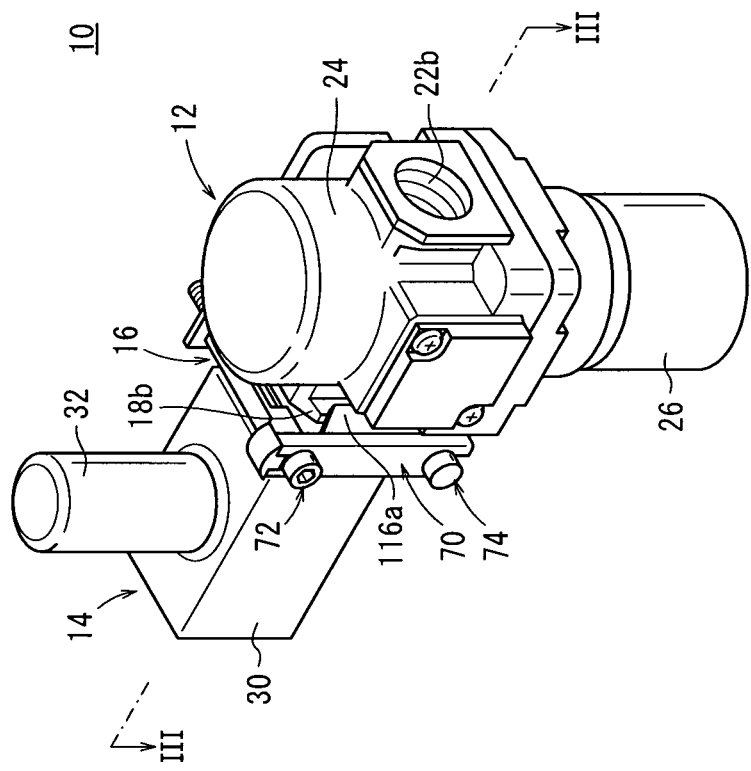
FIG. 2 is an exterior perspective view showing the fluid pressure unit of FIG. 1 in an assembled state.
Figure 3:
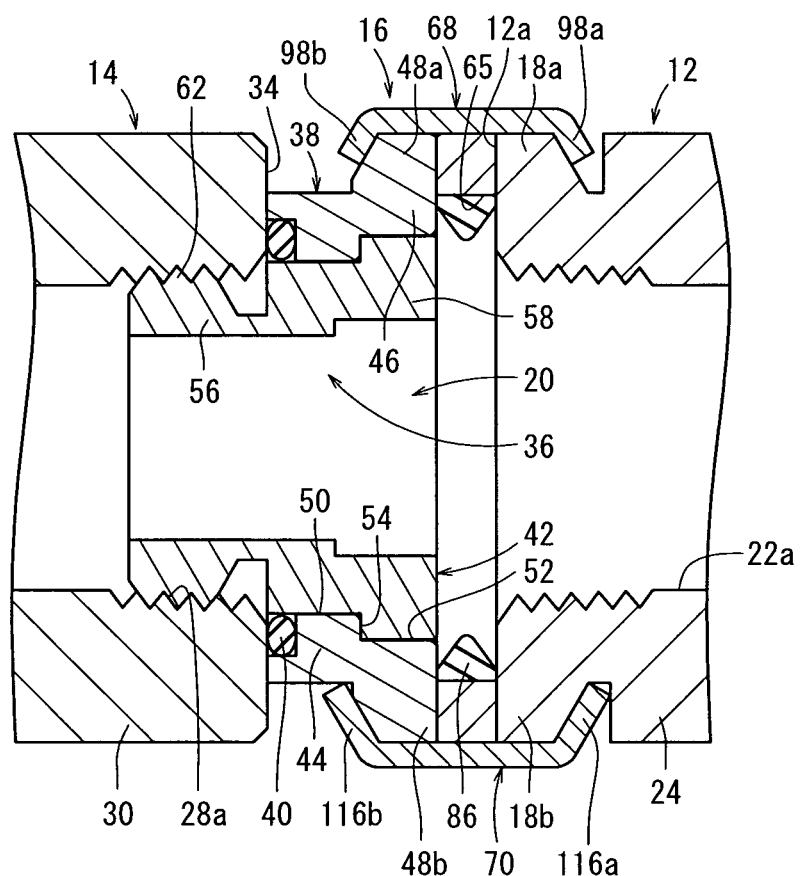
FIG. 3 is an enlarged vertical cross sectional view taken along line of FIG. 2.

As shown in FIGS. 1 to 3, the fluid pressure unit 10 includes a regulator 12, which reduces the pressure of a pressure fluid, a two-way valve 14 adjacent to the regulator 12, and which is capable of switching between flow states of the pressure fluid, and a connecting apparatus 16 interposed between the regulator 12 and the two-way valve 14 for connecting them mutually together. A case shall be described in which a pair of coupling members (projections) 18a, 18b, which are joined with the connecting apparatus 16, are provided beforehand on the aforementioned regulator 12. The coupling members 18a, 18b are not provided on the two-way valve 14. An adapter (connector) 20 is mounted in one port 28a of the two-way valve 14, whereby the regulator 12 and the two-way valve 14 are mutually interconnected by the connecting apparatus 16 through the adapter 20.

The regulator 12 functions as a fluid pressure device, which is capable of reducing the pressure of a pressure fluid supplied from the outside until a desired pressure is reached, and of outputting the pressure fluid externally thereof. The regulator 12 includes a main body portion 24 having a pair of ports 22a, 22b through which the pressure fluid is supplied and discharged, a casing 26 connected to an end of the main body 24, and a pair of coupling members 18a, 18b (see FIG. 3), which are formed in a mutually confronting relation on outer edge parts of an end surface of the main body 24 on which the ports 22a, 22b are disposed. Further, inner circumferential surfaces of the ports 22a, 22b are engraved with threads thereon.

The two-way valve 14 functions as a fluid pressure device, which is capable of switching between flow states of the pressure fluid supplied from the exterior. The two-way valve 14 is formed by a valve body 30 having a pair of ports 28a, 28b through which a pressure fluid enters and exits, and a solenoid portion 32 connected to an upper part of the valve body 30, which is magnetically excited when energized and displaces a valve plug (not shown). The valve body 30 includes the aforementioned ports 28a, 28b, which open thereon, and an attachment surface (end surface) 34 that is connected to another fluid pressure device, wherein the attachment surface 34 is formed as a flat planar surface. Further, inner circumferential surfaces of the ports 28a, 28b are engraved with threads thereon.

Figure 4:
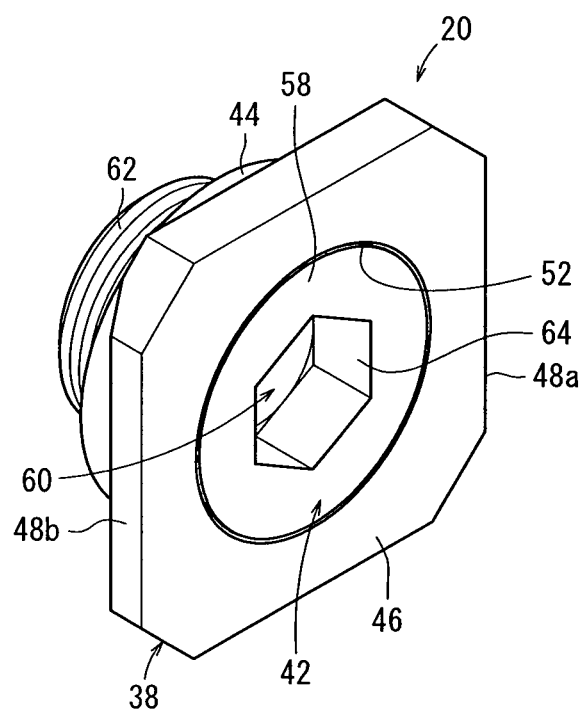
FIG. 4 is an exterior perspective view of the adapter shown in FIG. 1.
Figure 5:
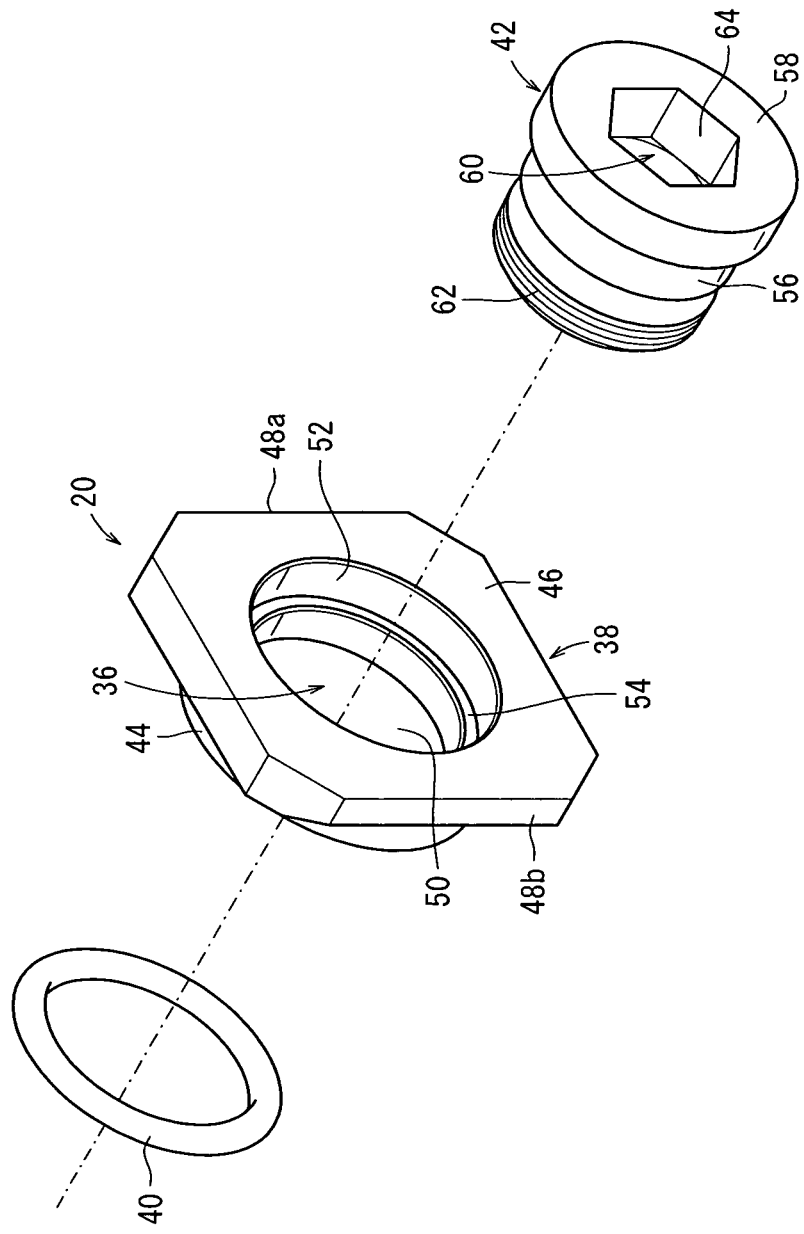
FIG. 5 is an exploded perspective view of the adapter of FIG. 4.
Figure 6:
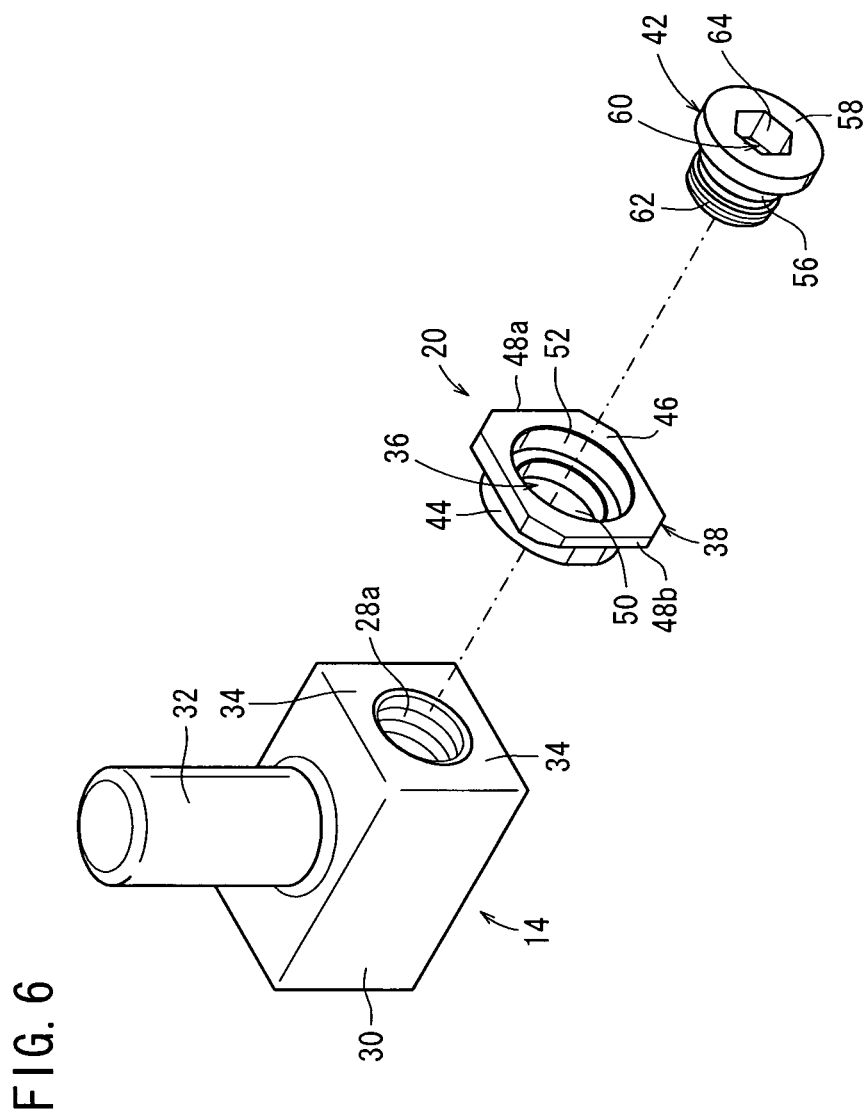
FIG. 6 is an exploded perspective view showing an assembly relationship of the adapter of FIG. 4 with a two-way valve to which the adapter is connected.
Figure 7:
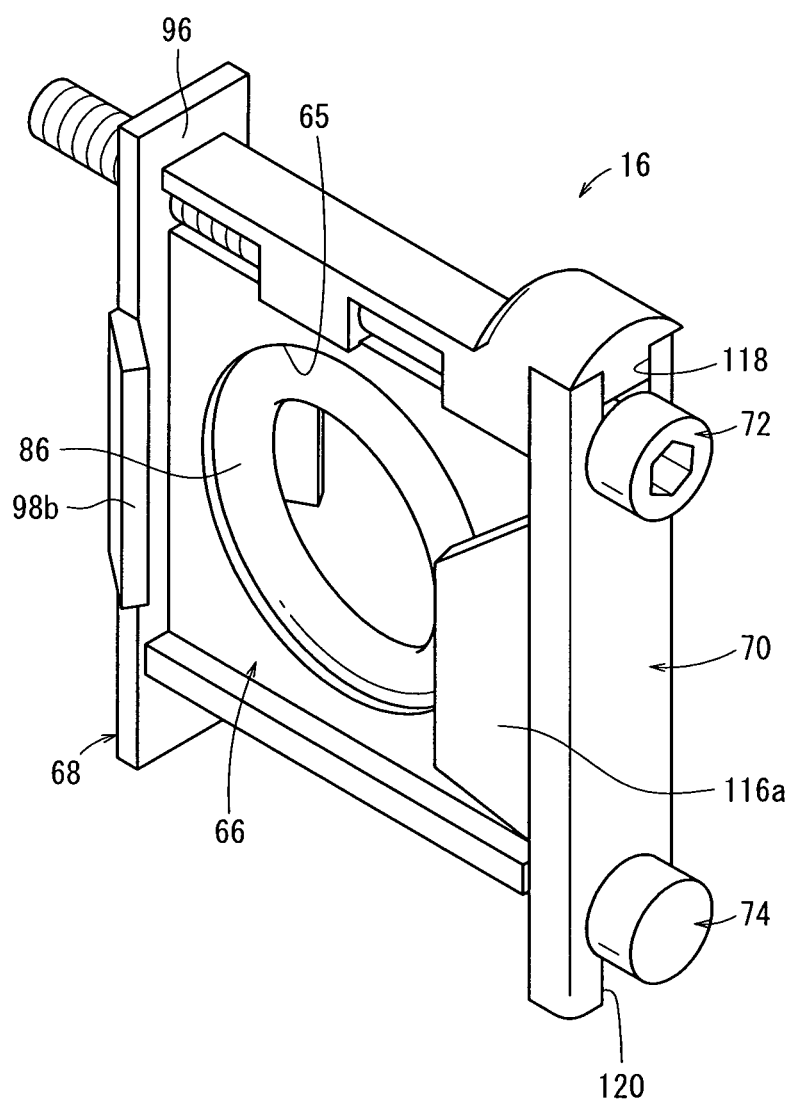
FIG. 7 is an exterior perspective view of the connecting apparatus shown in FIG. 1.
Figure 8:
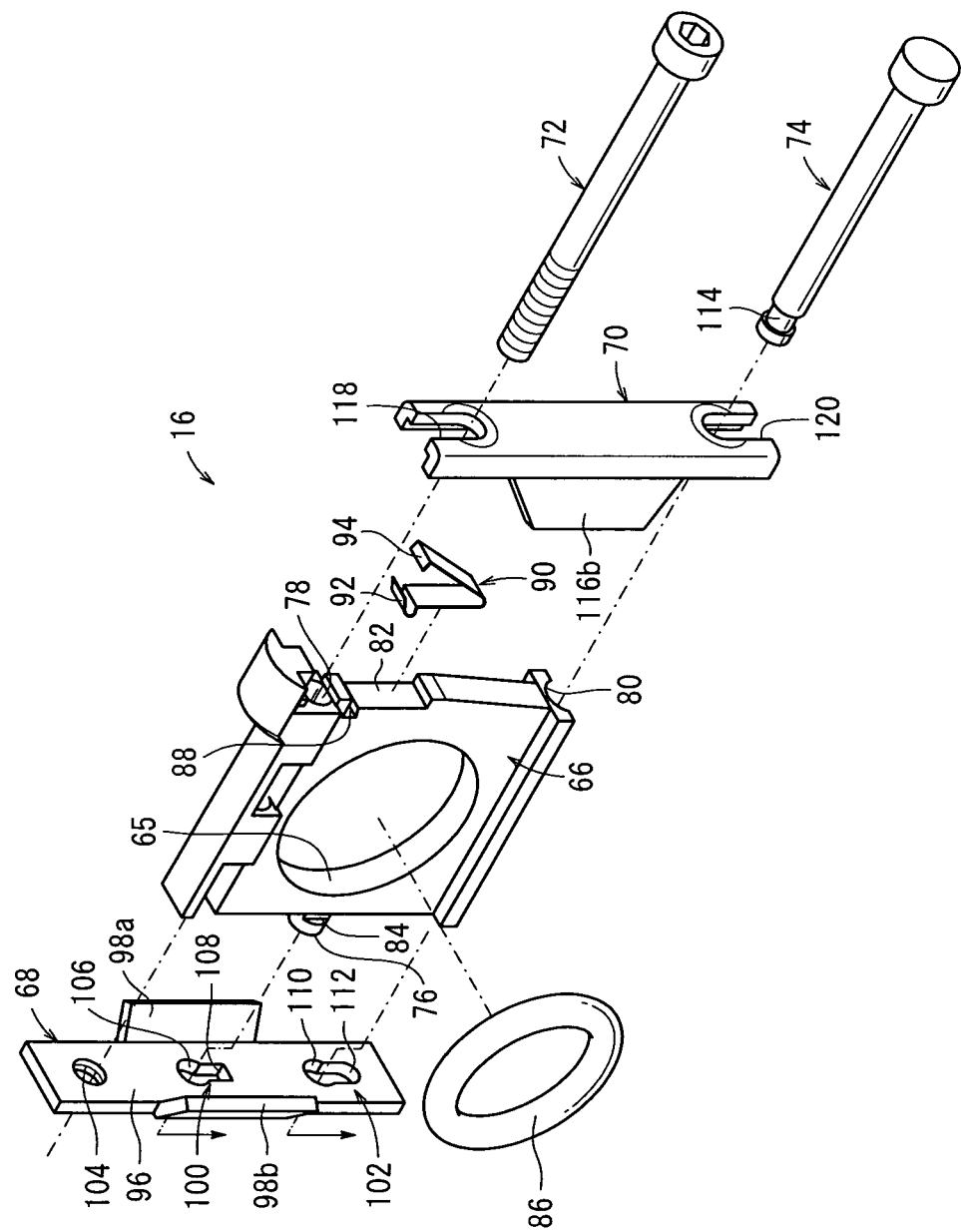
FIG. 8 is an exploded perspective view of the connecting apparatus shown in FIG. 7.
Figure 9:
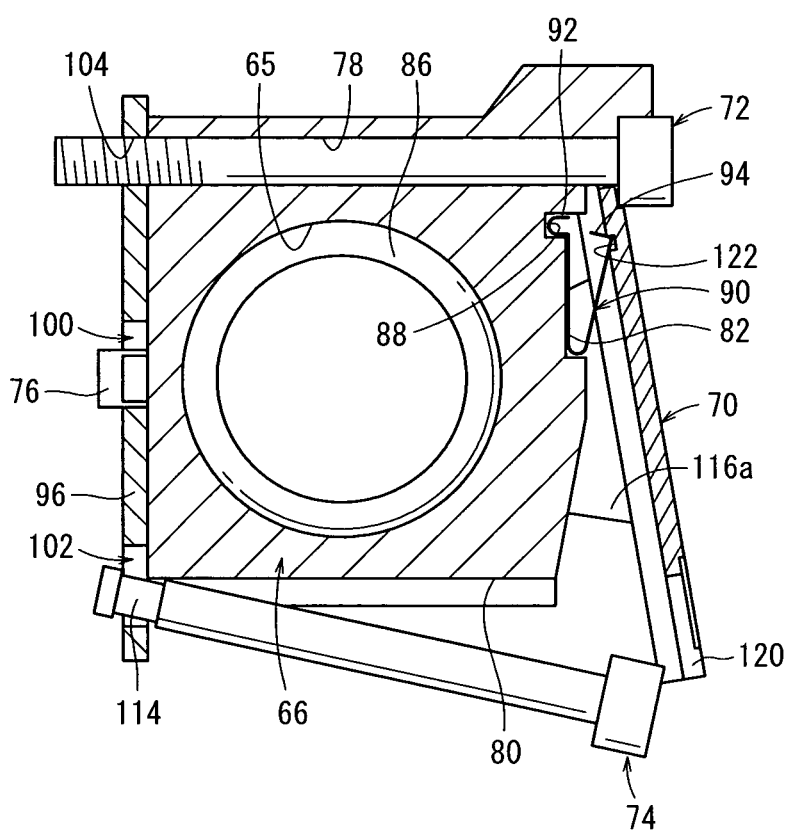
FIG. 9 is a vertical cross sectional view showing a state in which a pin member is tilted and a second retaining member is pressed upwardly by a plate spring, when a regulator and a two-way valve are connected by means of the connecting apparatus of FIG. 7.
Figure 10:
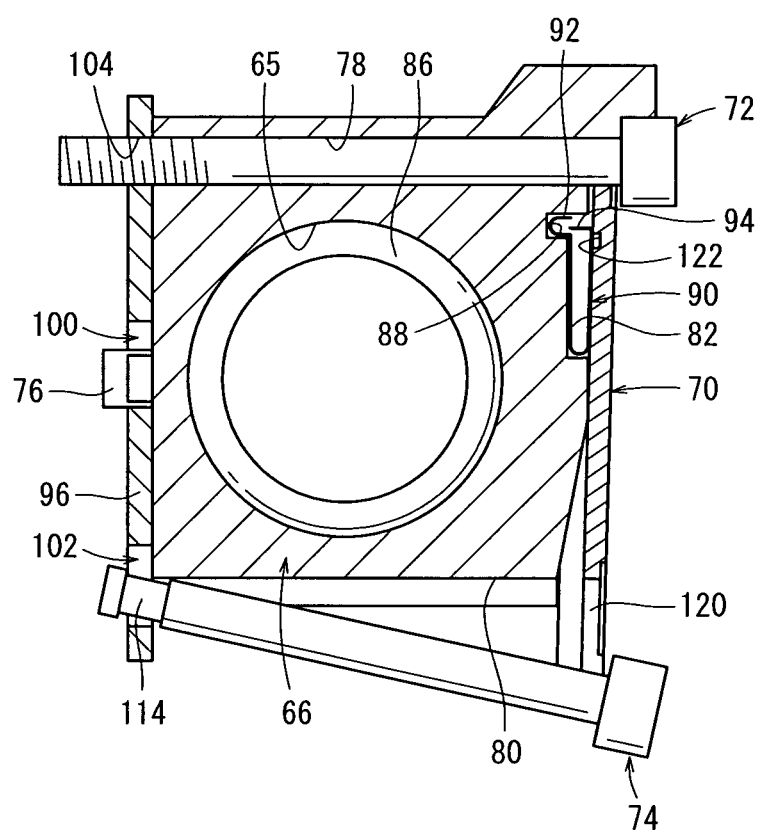
FIG. 10 is a vertical cross sectional view showing a state in which the second retaining member is pressed toward the side of a body in opposition to an elastic force of the plate spring, in the connecting apparatus of FIG. 8.
Figure 11:
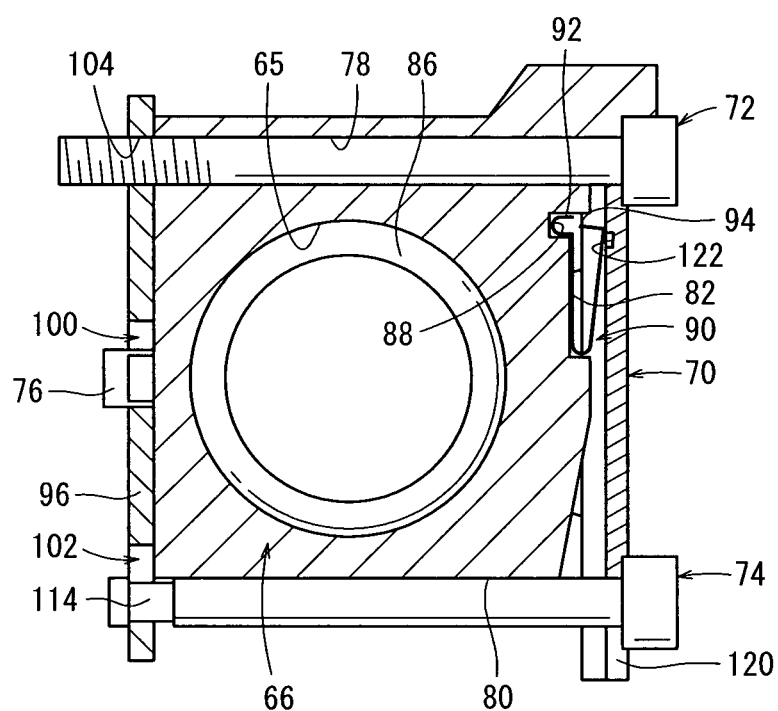
FIG. 11 is a vertical cross sectional view showing a locked state in which the pin member is tilted again toward the side of the body and engages with the second retaining member, in the connecting apparatus of FIG. 10.

As shown in FIGS. 4 to 6, the adapter 20 includes a base body 38 having a hole 36 formed centrally therein, a seal member 40 (see FIG. 3) that is installed around the outer circumferential region of the hole 36, and a connecting plug (first connecting member) 42 inserted through the hole 36 and which is screw-engaged with the port 28a of the two-way valve 14 that makes up one of the fluid pressure devices.

The base body 38 is formed, for example, from a metal material such as aluminum or the like. The hole 36 thereof is arranged so as to face toward the port 28a of the two-way valve 14. The base body 38 includes a cylindrical portion 44 through which the hole 36 penetrates in the interior of the base body 38, and a flange 46 formed on one end of the cylindrical portion 44, which is expanded in width with a substantially rectangular shape in a widthwise direction with respect to the cylindrical portion 44. The base body 38 is not limited to being formed from a metal material as mentioned above, but may also be formed from a resin material, for example.

The cylindrical portion 44 is disposed substantially centrally on the base body 38, and a seal member 40 is installed in an annular groove that is expanded in diameter in a radial outward direction with respect to the hole 36 on the other end of the cylindrical portion 44. The seal member 40 is formed from an elastic material and is mounted in such a way that it projects outwardly slightly with respect to the end surface of the other end on the cylindrical portion 44.

The flange 46 is formed to have a predetermined thickness along the axial direction of the cylindrical portion 44, and is expanded in width in four directions about the center of the cylindrical portion 44.

The flange 46 comprises a pair of coupling members (projections) 48a, 48b that face each other across the hole 36 of the cylindrical portion 44. The side surfaces of the coupling members 48a, 48b on sides of the cylindrical portion 44 are formed with tapered shapes, which gradually become thinner toward the ends thereof. Stated otherwise, on the flange 46, the side surface on an opposite side from the side surface that adjoins the cylindrical portion 44 is formed with a substantially uniform planar shape. Furthermore, the coupling members 48a, 48b of the flange 46 are formed with substantially the same shape as the coupling members 18a, 18b of the regulator 12 to which they are to be joined.

The hole 36 includes a first hole portion 50 disposed in the interior of the cylindrical portion 44 and formed with a substantially constant diameter, and a second hole portion 52 disposed in the interior of the flange 46, which is expanded in diameter radially with respect to the first hole portion 50. The first and second hole portions 50, 52 are formed on the same axis, and a step 54 is formed at the boundary of the first hole portion 50 and the second hole portion 52, which extends perpendicular to the axis of the first and second hole portions 50, 52.

The connecting plug 42 is formed from a metal material such as brass or the like and is inserted through the hole 36 from the side of the second hole portion 52 thereof. The connecting plug 42 includes a small diameter portion 56 formed on one end thereof, which is inserted through the first hole portion 50 in the hole 36, a large diameter portion 58 formed on the other end thereof, which is inserted through the second hole portion 52 in the hole 36, and a port hole (hole) 60 that penetrates centrally through the small diameter portion 56 and the large diameter portion 58. The connecting plug 42 is not limited to being formed from a metal material as described above, but may also be formed from a resin material, for example.

Threads (screw section) 62 are engraved along the outer circumferential surface in the vicinity of the end of the small diameter portion 56. By screw-engagement of the threads 62 with respect to the port 28a of the two-way valve 14, the connecting plug 42 is coupled with respect to the port 28a. Specifically, the diameter of the small diameter portion 56 is set to be the same or just slightly larger than the inner circumferential diameter of the port 28a in the fluid pressure device, with which the connecting plug 42 is screw-engaged.

Further, by insertion of the small diameter portion 56 through the first hole portion 50, the central axis of the connecting plug 42 and the central axis of the base body 38 can be matched with one another.

The large diameter portion 58 includes a tool hole 64 therein formed in a hexagonal shape on the inner circumferential surface of the port hole 60. By inserting a tool such as a hex-wrench or the like (not shown) into the tool hole 64 and rotating the tool, the connecting plug 42 is threaded and screw-engaged tightly with respect to the port 28a of the two-way valve 14. The port hole 60 including the tool hole 64 is formed with substantially the same diameter.

Further, when the connecting plug 42 is inserted through the hole 36, the small diameter portion 56 is inserted through the first hole portion 50, whereby the end portion on which the threads 62 are engraved is exposed outside, and the end surface of the large diameter portion 58 on the side of the small diameter portion 56 engages with the step 54 and is stopped by engagement therewith. Specifically, displacement along the axial direction of the connecting plug 42 with respect to the base body 38 is regulated, whereby the elements are mutually positioned. Further, the large diameter portion 58 is accommodated in the interior of the second hole portion 52, such that the large diameter portion 58 does not project from the side surface of the flange 46 on the base body 38, but rather the end surface of the large diameter portion 58 becomes substantially flush and co-planar with the side surface of the flange 46.

The connecting apparatus 16, as illustrated in FIGS. 7 through 11, includes a substantially square shaped body 66 having an installation hole 65 in the substantial center thereof, first and second retaining members 68, 70 mounted on respective side surfaces of the body 66, a bolt 72 that connects the first and second retaining members 68, 70 to the body 66, and a pin member 74 that latches the second retaining member 70 when the connecting apparatus 16 is connected together with the fluid pressure devices.

The body 66 is made up from a support pin 76 that projects from a substantially central portion of an end surface that is connected with the first retaining member 68, a through hole 78 formed on one side surface of the body 66 and through which the bolt 72 is inserted, a guide groove 80 formed on another side surface of the body 66 and substantially parallel with the through hole 78, and a recess 82, which is recessed a predetermined depth into the other side surface onto which the second retaining member 70 is mounted. The support pin 76 is formed with a shaft-like shape. A first cutout portion 84 is formed at a region spaced from an end portion of the support pin 76 and proximate to the side of the body 66.

A seal member 86 formed from an elastic material is mounted in the installation hole 65 of the body 66. The diameter of the installation hole 65 is formed so as to be slightly smaller than the outer circumferential diameter of the seal member 86, so that when the two-way valve 14 on which the adapter 20 is installed and the regulator 12 are connected to both sides of the connecting apparatus 16, a pressure fluid that flows through the installation hole 65 and between the ports 22a, 28b is prevented from leaking to the outside from the contact surface where the installation hole 65 contacts with the outer circumferential surface of the seal member 86.

Further, the guide groove 80 serves to guide the pin member 74 along the other side surface of the body 66 when the pin member 74 is installed with respect to the body 66.

The recess 82 is formed on the other end surface of the body 66 onto which the second retaining member 70 is mounted. A groove 88, which is recessed even more with respect to the recess 82, is formed on a side of the recess 82, proximate to the through hole 78. In addition, a plate spring 90 is sandwiched between the recess 82 of the body 66 and the second retaining member 70.

The plate spring 90 is formed from a plate member that is folded in a V-shape in cross section. A projection 92 made by bending the plate member is formed on an end part of the plate spring 90. The plate spring 90 is positioned with respect to the body 66 by engagement of the projection 92 inside the groove 88 of the recess 82. On the other hand, a folded portion 94, which is bent substantially at a right angle, is formed on the other end part of the plate spring 90.

The first retaining member 68 includes a flat connecting section 96 connected to the body 66, and a pair of first connecting flanges 98a, 98b inclined at a predetermined angle, which project on both sides from the substantial center of the connecting section 96. On the connecting section 96, there are formed a first engagement hole 100, formed in a substantially central portion thereof and with which the support pin 76 is engaged, a second engagement hole 102 formed so as to be separated a predetermined distance from the first engagement hole 100 and with which the pin member 74 is engaged, and a bolt hole 104 separated a predetermined distance from the first engagement hole 100, and which is formed on an opposite side thereof from the second engagement hole 102.

The first engagement hole 100 is formed in a keyhole-shaped formation by combining a substantially circular shape and a substantially rectangular shape, respectively. In addition, a substantially circular shaped first insertion hole 106 is formed on one end side of the first engagement hole 100, whereas a first engagement groove 108 having a substantially rectangular shape, which is narrower than the diameter of the first insertion hole 106, is formed on the other end side thereof.

Further, the second engagement hole 102 also is formed substantially in a keyhole-shaped formation, having a substantially circular shaped second insertion hole 110 on one side thereof, whereas a second engagement groove 112, which is narrower than the diameter of the second insertion hole 110, is formed at the other end side thereof.

The pin member 74 includes a second cutout portion 114 distanced a predetermined interval from the end thereof. The second cutout portion 114 is formed in an annular shape and is recessed with respect to the shaft portion on the pin member 74.

In addition, one end of the body 66 abuts against the connecting section 96 of the first retaining member 68. By insertion of the end part of the support pin 76 into the first insertion hole 106 and engagement of the first cutout portion 84 of the support pin 76 with the first engagement groove 108, the body 66 is connected with respect to the first retaining member 68.

Further, by insertion of the end of the pin member 74 into the second insertion hole 110 of the second engagement hole 102 and engagement of the second cutout portion 114 of the pin member 74 with respect to the second engagement groove 112, the body 66 is retained by the first retaining member 68 via the pin member 74.

Furthermore, by insertion and screw-engagement of the bolt 72 into the bolt hole 104 via the second retaining member 70 and the through hole 78 of the body 66, the first retaining member 68, the second retaining member 70 and the body 66 are fixed together integrally.

The first connecting flanges 98a, 98b are formed so as to be inclined at a predetermined angle in directions that mutually separate from each other from both sides about the center portion of the connecting section 96, such that the first connecting flanges 98a, 98b engage with the coupling members 18a of the regulator 12 as well as the coupling member 48a of the adapter 20. The angle of inclination of the first connecting flanges 98a, 98b is set at an angle that corresponds with the angle of inclination of the coupling member 18a of the regulator 12, on which the one surface side thereof is formed in a tapered shape, and the angle of inclination of the coupling member 48a of the adapter 20.

On the other hand, the second retaining member 70 is formed from a pair of second connecting flanges 116a, 116b, which have substantially rectangular shapes and are inclined at predetermined angles from both sides of a substantially central portion, a first cutout groove 118 formed on one end thereof with which the shaft of the bolt 72 engages, and a second cutout groove 120 formed on the other end thereof with which the shaft of the pin member 74 engages.

The second connecting flanges 116a, 116b are formed so as to be inclined at a predetermined angle in directions that mutually separate from each other from both sides about the center portion of the second retaining member 70. By pressing the second retaining member 70 in opposition to the spring force of the plate spring 90 such that the second cutout groove 120 approaches the body 66, the second connecting flanges 116a, 116b engage with the coupling member 18b of the regulator 12 and the coupling member 48b of the adapter 20. The angle of inclination of the second connecting flanges 116a, 116b is set at an angle that corresponds with the angle of inclination of the coupling member 18b of the regulator 12, on which the one surface side thereof is formed in a tapered shape, and with the angle of inclination of the coupling member 48b of the adapter 20.

Further, the second retaining member 70 is formed with an engagement recess 122 therein (see FIG. 9), at a position abutting with the folded portion 94 of the plate spring 90 when the plate spring 90 is energized so that the second retaining member 70 is inclined at a given angle under an elastic force of the plate spring 90. Specifically, in a state in which the folded portion 94 is pressed toward the second retaining member 70, by engagement of the folded portion 94 in the engagement recess 122, the second retaining member 70 is prevented from becoming detached from the bolt 72, with which the second retaining member 70 is engaged. Furthermore, when the regulator 12 and the two-way valve 14 to which the adapter 20 is installed are connected, the second retaining member 70 is pressed toward the side of the body 66, and the folded portion 94 detaches from the engagement recess 122 toward the direction of the first cutout groove 118.

The fluid pressure unit 10, which is connected mutually through the adapter 20 according to the first embodiment of the present invention, is basically constructed as described above. Next, a case shall be described, in which the adapter 20 is mounted with respect to one port 28a on the two-way valve 14 that defines a fluid pressure device.

First, the base body 38 that makes up the adapter 20 is gripped and the end surface of the cylindrical portion 44 is made to abut against the attachment surface 34 of the two-way valve 14 where the port 28a thereof is opened, whereupon the pair of coupling members 48a, 48b are arranged so as to extend in a horizontal direction. Additionally, in a state in which the base body 38 abuts against the attachment surface 34 of the two-way valve 14, the small diameter portion 56 of the connecting plug 42, which has been inserted beforehand through the hole 36 of the base body 38, is threaded with respect to the port 28a. At this time, the seal member 40 disposed on the end surface of the cylindrical portion 44 abuts against the attachment surface 34 of the two-way valve 14, performing a sealing function.

Next, by insertion and rotation of a hex-wrench in the tool hole 64 of the connecting plug 42, the connecting plug 42 is gradually displaced toward the two-way valve 14 in a screw-engaged state therewith, and the large diameter portion 58 is stopped through engagement with the step 54 of the base body 38. Accordingly, the cylindrical portion 44 of the base body 38 is sandwiched and gripped between the large diameter portion 58 and the attachment surface 34 of the two-way valve 14. As a result, by means of the connecting plug 42, the adapter 20 including the base body 38 is installed with respect to the attachment surface 34 of the two-way valve 14 facing the port 28a.

In this case, the hole 36 of the adapter 20 and the port 28a are arranged coaxially in communication with each other, whereas the end surface of the large diameter portion 58 on the connecting plug 42 and the end surface of the flange 46 on the base body 38 are made substantially coplanar.

In this manner, the adapter 20 can be installed easily by means of a simple operation, in which the connecting plug 42 is threaded with respect to the port 28a, with respect to the two-way valve 14, which is not equipped with coupling members 18a, 18b capable of being connected to the connecting apparatus 16.

Further, the adapter 20 can be constructed simply from the base body 38 having the hole 36 therein, the seal member 40 that is installed onto the cylindrical portion 44 of the base body 38, and the connecting plug 42, which is inserted through the hole 36 and threaded into the ports 28a, 28b of the fluid pressure device, and thus manufacturing costs therefor can be reduced.

Moreover, since the adapter 20 can be mounted using the port 28a through which pressure fluid is supplied and discharged in a fluid pressure device such as the two-way valve 14 or the like, it is unnecessary to perform any additional process for installing the adapter 20 onto a fluid pressure device that is not equipped beforehand with coupling members 18a, 18b, and therefore the adapter 20 is highly versatile.

Still further, because the seal member 40 disposed on the cylindrical portion 44 of the base body 38 abuts and is pressed against the attachment surface 34 of the two-way valve 14, a fluidtight condition is reliably maintained between the adapter 20 including the base body 38 and the two-way valve 14, and thus external leakage of pressure fluid that passes through the interior of the adapter 20 can be prevented.

Next, a brief explanation shall be given concerning a case in which the two-way valve 14 with the above-noted adapter 20 installed therein and the regulator 12, which has been equipped beforehand with the coupling members 18a, 18b, are interconnected by means of the connection apparatus 16. It shall be understood, however, that the order of the assembly steps for assembling the two-way valve 14 and the regulator 12 is not limited to the order described herein.

At first, the adapter 20 installed in the two-way valve 14, and the coupling members 18a, 18b of the regulator 12 to which the two-way valve 14 is to be connected, are arranged beforehand so as to face toward each other.

Next, in the connecting apparatus 16, the pin member 74 is titled through a predetermined angle about the region where the pin member 74 is supported in the first retaining member 68 so that the pin member 74 separates from the second cutout groove 120 of the second retaining member 70. Then, under the elastic force of the plate spring 90, the second retaining member 70 obtains a state in which it becomes tilted and pressed upwardly a predetermined angle about the portion of the first cutout groove 118, which is supported by the bolt 72.

While in this state, the two-way valve 14 and the regulator 12 are brought into mutual proximity with each other until reaching a state in which they are separated by a predetermined distance, and the first connecting flange 98a of the first retaining member 68 engages with respect to the coupling members 18a, 18b of the regulator 12, which makes up one of the fluid pressure devices, whereas the first connecting flange 98b disposed on the opposite side engages with respect to the coupling member 48a of the adapter 20 that is installed in the two-way valve 14. Owing thereto, the attachment surface 12a of the regulator 12 abuts against one side surface of the body 66 on the connecting apparatus 16, while the flange 46 of the adapter 20 abuts against the other side surface on the body 66. Stated otherwise, the body 66 of the connecting apparatus 16 is gripped, while the adapter 20 and the attachment surface 12a of the regulator 12 face toward one another.

Next, the second retaining member 70 that is inclined in a direction away from the body 66 is pressed, and is tiltably displaced toward the side of the body 66 in opposition to the elastic force of the plate spring 90, so that the second retaining member 70 is restored to a condition where it lies parallel to the body 66. As a result, the second connecting flanges 116a, 116b of the second retaining member 70 engage respectively with respect to the coupling member 18b of the regulator 12 and the coupling member 48b of the adapter 20. Further, because the installation hole 65 of the body 66 constituting the connecting apparatus 16 is positioned coaxially in communication with the port 22a of the regulator 12 and the hole 36 of the adapter 20, the two-way valve 14 and the regulator 12 acquire a state of mutual communication by way of the connecting apparatus 16 and the adapter 20.

Lastly, the pin member 74 is tiltably displaced about the region where it is supported in the first retaining member 68 so as to approach toward the side of the body 66, and the shaft of the pin member 74 engages within the second cutout groove 120. Owing thereto, the second retaining member 70 is retained in a state where it lies parallel to the body 66. As a result, the regulator 12 and the two-way valve 14, which define respective fluid pressure devices arranged on both sides of the connecting apparatus 16, are connected together integrally by the connecting apparatus 16 through the adapter 20, and in addition, the port 22a of the regulator 12 and the port 28a of the two-way valve 14 are placed in communication by way of the hole 36 of the adapter 20 and the installation hole 65 of the connecting apparatus 16.

At this time, because the seal member 86 disposed on the connecting apparatus 16 abuts against the attachment surface 12a of the regulator 12 as well as the end surface of the adapter 20, a fluidtight condition is maintained between the connecting apparatus 16, the regulator 12 and the adapter 20, and leakage of the pressure fluid that flows through the regulator 12 and the two-way valve 14 is prevented.

In this manner, the adapter 20 can be constructed easily from the base body 38 and the connecting plug 42, which is inserted through the hole 36 of the base body 38 and screw-engaged in the port 28a of the fluid pressure device. By mounting of the adapter 20 onto the fluid pressure device, even in the case of a fluid pressure device that is not equipped beforehand with coupling members 18a, 18b thereon, the fluid pressure device can be mutually connected to another device easily and reliably through the connecting apparatus 16.

Further, because the tool hole 64, into which a tool (not shown) is inserted when the connecting plug 42 is tightened and the port hole 60 through which the pressure fluid flows are utilized in a dual-purpose manner, compared to a case in which the port hole 60 and the tool hole 64 are provided separately, the adapter 20 including the connecting plug 42 can be made smaller in size and scale.

In the foregoing explanations, a case has been described in which the coupling members 48a, 48b are connected to the adapter 20 so as to extend substantially perpendicular with respect to the solenoid portion 32 of the two-way valve 14, and moreover, the adapter 20 is connected to the fluid pressure unit 10 such that the axis of the solenoid portion 32 and the axis of the regulator 12 are substantially parallel with each other. However, the invention is not limited to this configuration.

Figure 12A:
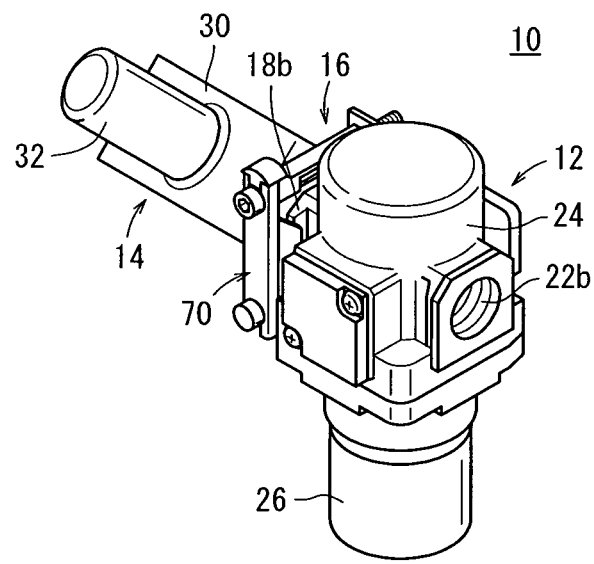
FIG. 12A is a perspective view illustrating a state in which a two-way valve is rotated through 45° and is connected with respect to the regulator of FIG. 2.
Figure 12B:
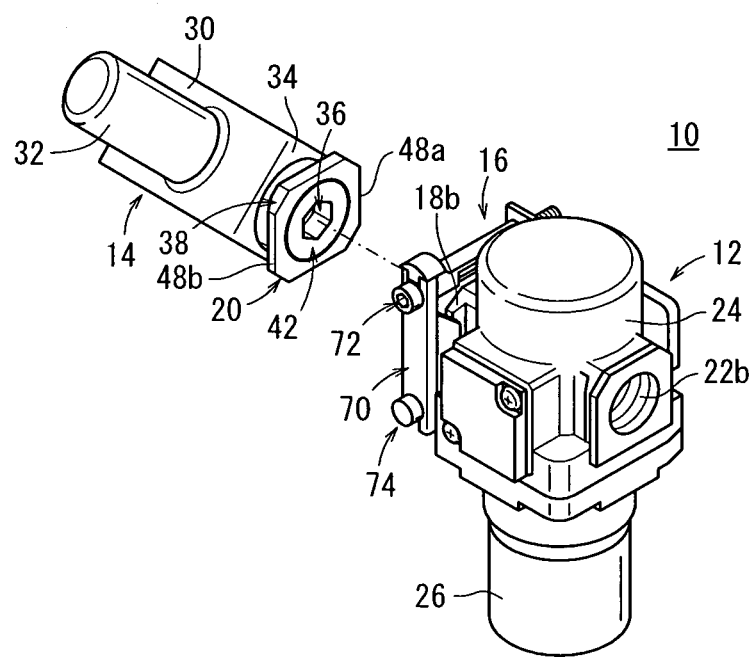
FIG. 12B is an exploded perspective view in which the two-way valve is detached from the regulator of FIG. 12A.

For example, as shown in FIG. 12B, it also is acceptable for the two-way valve 14 to be rotated by a given angle (e.g., 45°) with respect to the pair of coupling members 48a, 48b on the adapter 20, and then, as shown in FIG. 12A, the two-way valve 14 is connected to the coupling members 18a, 18b of the regulator 12 through the adapter 20. Owing thereto, a structure for the fluid pressure unit 10 is enabled, in which the connection is made in a rotated state, such that the axis of the solenoid portion 32 and the axis of the regulator 12 intersect at a predetermined angle.

In greater detail, when the adapter 20 is installed with respect to the two-way valve 14, the coupling members 48a, 48b thereof are arranged horizontally facing toward the first and second connecting flanges 98a, 98b, 116a, 116b on the connecting apparatus 16, and the adapter 20 is connected to the port 28a of the two-way valve 14 in a state in which the two-way valve 14 is rotated at a desired attachment angle with respect to the regulator 12. Owing thereto, the adapter 20 and the two-way valve 14 are connected in a state such that the relative angle formed between the pair of coupling members 48a, 48b on the adapter 20 and the solenoid portion 32 of the two-way valve 14 is set at a predetermined angle (e.g., 45°). In addition, by connecting the two-way valve 14 to the regulator 12 through the adapter 20, a connection is made in a state in which the axis of the solenoid portion 32 on the two-way valve 14 is rotated a predetermined angle with respect to the axis of the regulator 12.

Figure 13A:
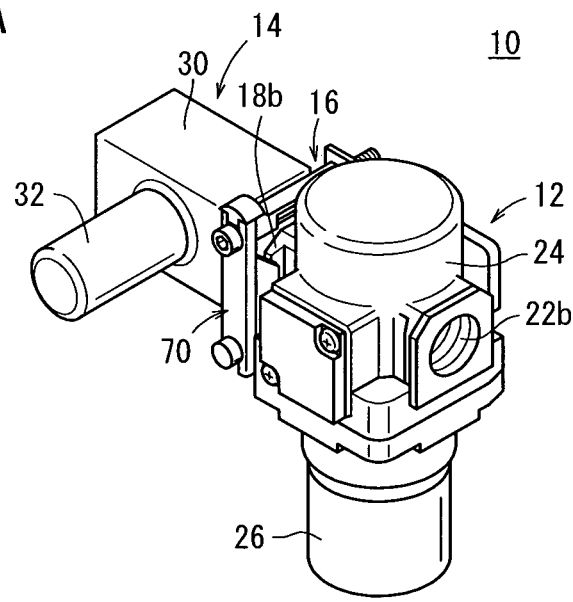
FIG. 13A is a perspective view illustrating a state in which the two-way valve is rotated further through 45° and is connected with respect to the regulator of FIG. 12.
Figure 13B:
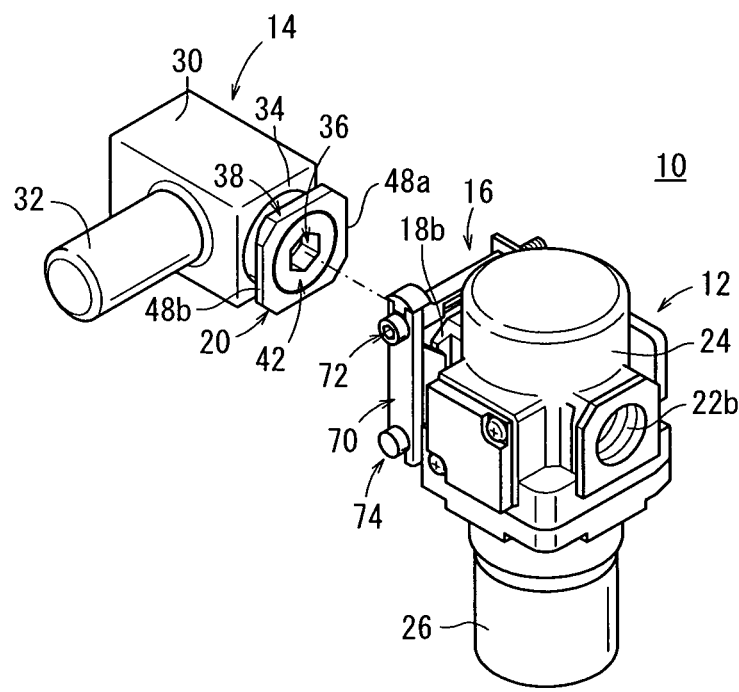
FIG. 13B is an exploded perspective view, in which the two-way valve is detached from the regulator of FIG. 12A.

Further, as shown in FIGS. 13A and 13B, a connection can be made, providing a state in which the axis of the solenoid portion 32 on the two-way valve 14 is rotated to be substantially perpendicular with respect to the axis of the regulator 12.

Specifically, by modifying the relative connecting angle between the adapter 20 and the two-way valve 14, which makes up the fluid pressure device to which the adapter 20 is connected, the two-way valve 14 and the regulator 12 connected thereto can be interconnected, while changing the attachment angle thereof arbitrarily by way of the adapter 20 and the connecting apparatus 16.

Further, simply by screw-rotating (unscrewing) the connecting plug 42 that is fixed in the port 28a of the two-way valve 14, easy detachment of the adapter 20 can be performed. Owing thereto, modification of the relative attachment angle between the aforementioned fluid pressure devices can be easily carried out.

In the forgoing description, a case has been explained in which one of the fluid pressure devices is a regulator 12 equipped with coupling members 18a, 18b thereon, whereas the other fluid pressure device is a two-way valve 14, which is not equipped with such coupling members 18a, 18b, and wherein the adapter 20 is installed in the two-way valve 14 and the respective fluid pressure devices are connected. However, the invention is not limited to this configuration.

Figure 14A:
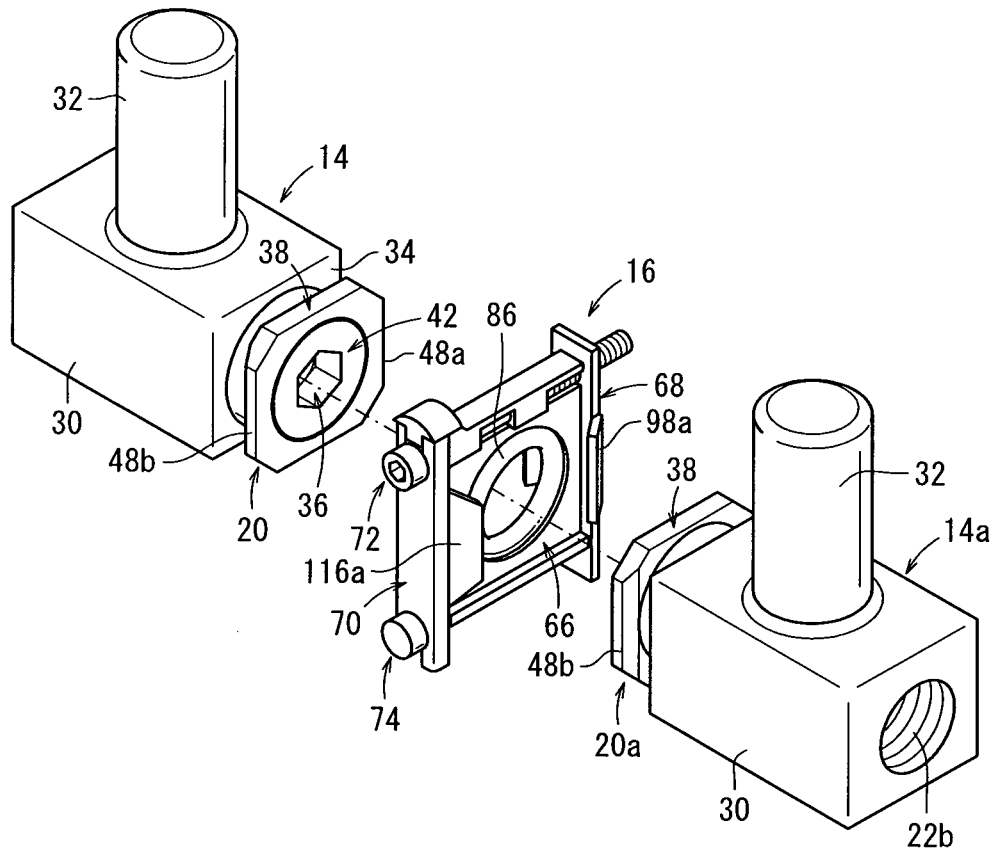
FIG. 14A is an exploded perspective view of a case in which adapters are mounted respectively with respect to two-way valves that are not equipped with coupling members, and wherein the two-way valves are to be connected together.
Figure 14B:
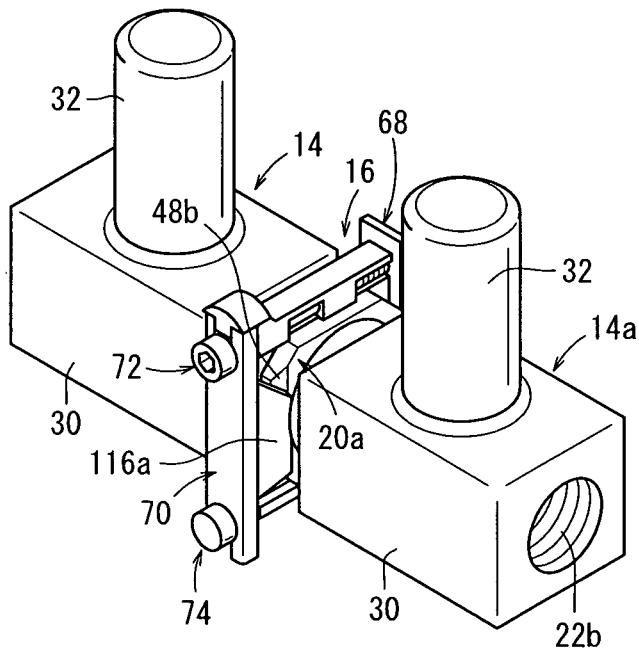
FIG. 14B is an exterior perspective view illustrating a state in which the two-way valves of FIG. 14A are connected together integrally through a connecting apparatus.

For example, as shown in FIGS. 14A and 14B, adapters 20, 20a may be installed into one two-way valve 14 and another two-way valve 14a, neither of which is equipped with coupling members 18a, 18b, such that both of the two-way valves 14 and 14a that make up the fluid pressure devices can be connected together by the connecting apparatus 16 through the adapters 20, 20a (see FIG. 14B).

Accordingly, fluid pressure devices having ports 28a, 28b therein can be easily and reliably connected together using the adapters 20, 20a.

Figure 15A:
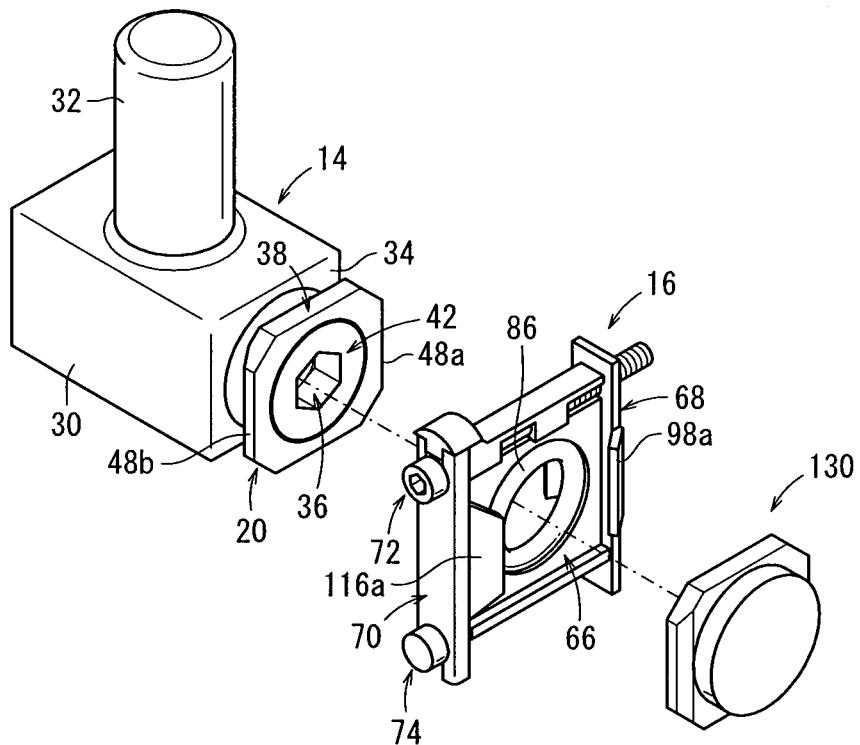
FIG. 15A is an exploded perspective view illustrating a case in which a cover member is installed that blocks the adapter, which is mounted on a two-way valve through a connecting apparatus.
Figure 15B:
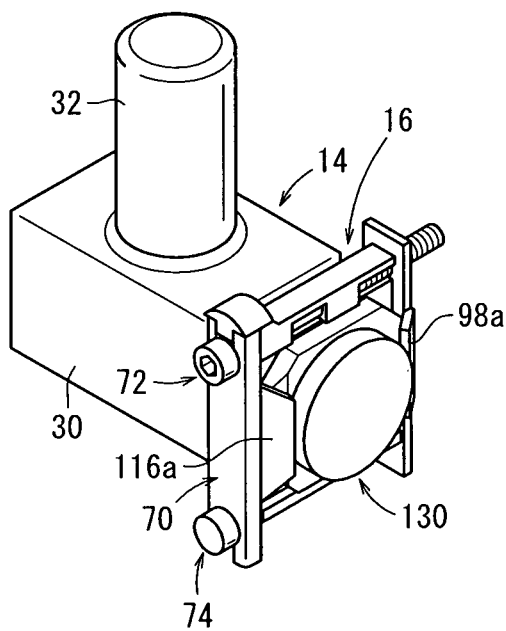
FIG. 15B is an exterior perspective view illustrating a state in which the cover member of FIG. 15A is attached through the connecting apparatus.

Furthermore, in the foregoing description, even if only the regulator 12 is detached from the connecting apparatus 16, as shown in FIGS. 15A and 15B, a cover member 130 can be installed with respect to one side surface of the connecting apparatus 16 on which the regulator 12 had previously been mounted, whereby the port 28b of the two-way valve 14, which remains connected to the connecting apparatus 16, can be blocked by the cover member 130.

The cover member 130 is formed from a metal material, for example, having substantially the same shape as the base body 38 on the adapter 20. However, the cover member 130 differs from the base body 38 of the adapter 20 in that it does not have a through hole 36 disposed centrally therein. Moreover, the cover member 130 is not limited to being formed from a metal material as stated above, but may also be formed from a resin material.

In this manner, even in the case that one of the fluid pressure devices attached to the connecting apparatus 16 is detached and removed, the open port 28a in the other fluid pressure device can easily and reliably be closed by installing the cover member 130 onto the connecting apparatus 16.

Figure 16:
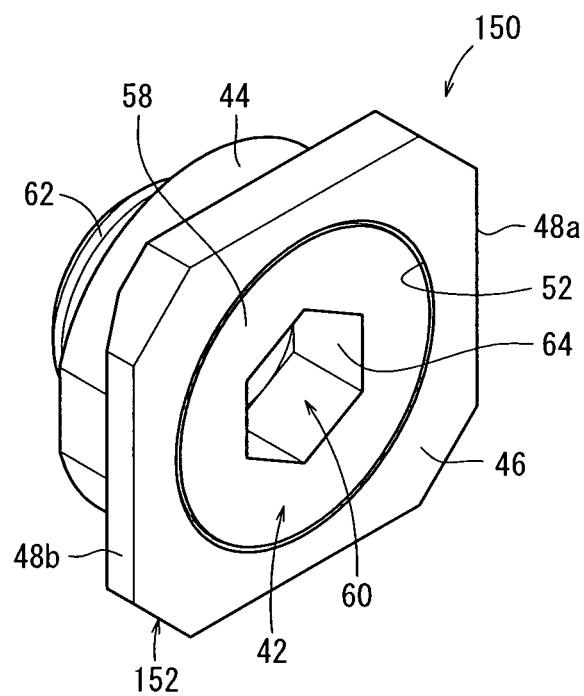
FIG. 16 is an exterior perspective view showing an adapter according to a second embodiment of the present invention.
Figure 17:
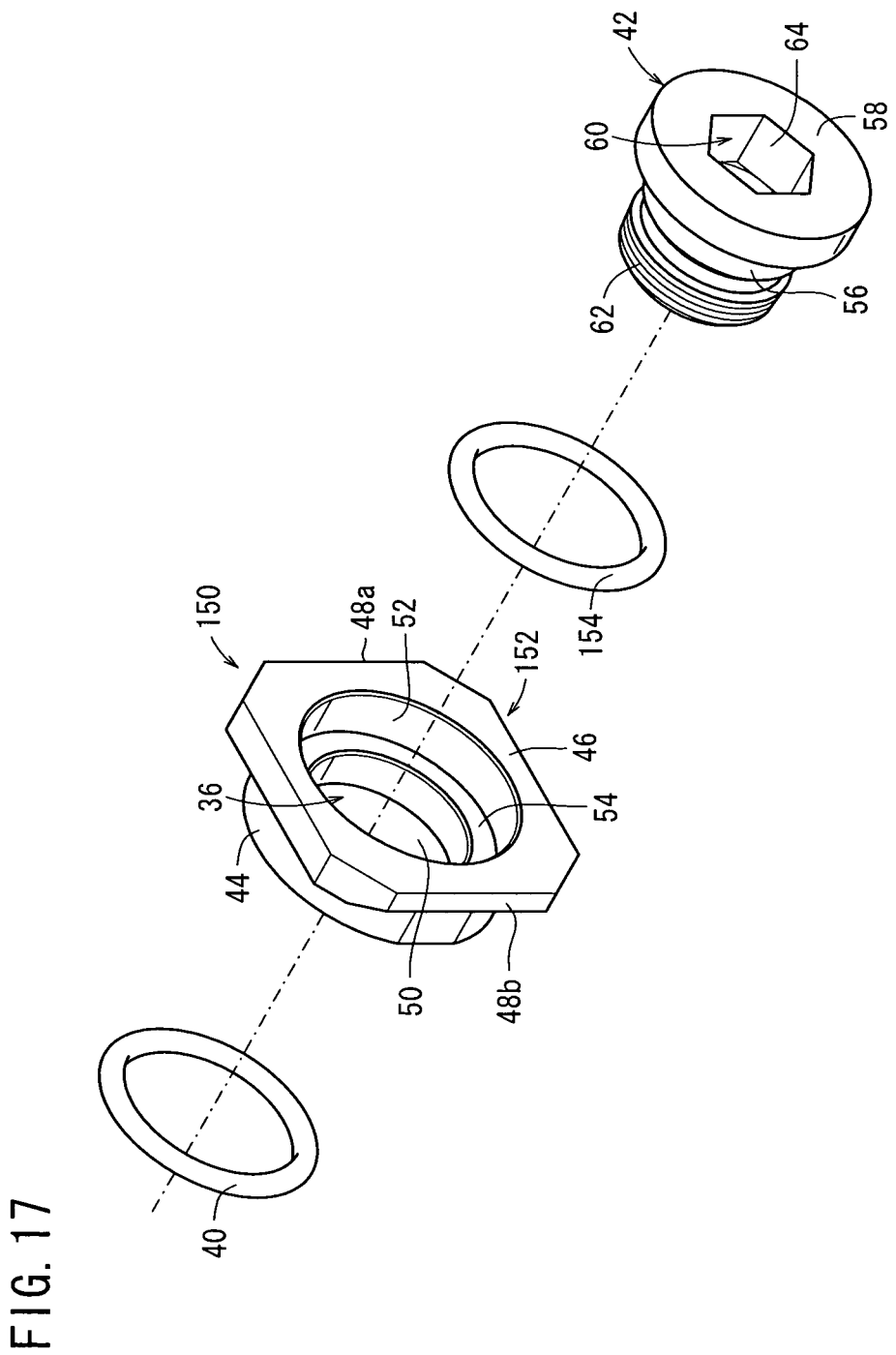
FIG. 17 is an exploded perspective view of the adapter shown in FIG. 16.
Figure 18:
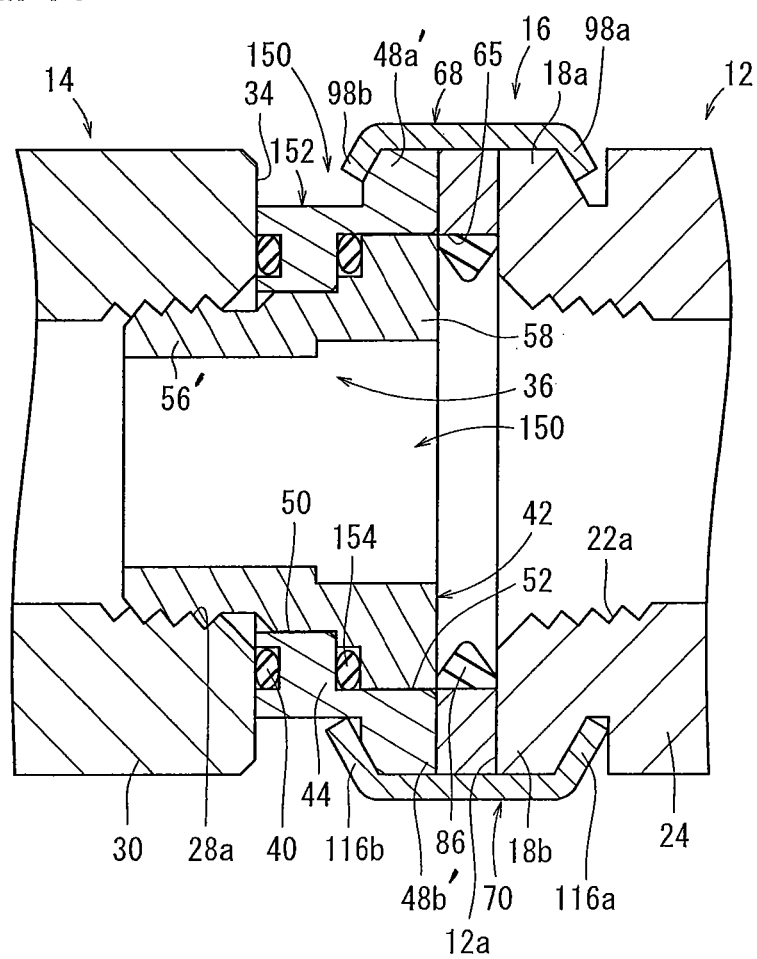
FIG. 18 is an enlarged cross sectional view showing a state in which the adapter of FIG. 16 is mounted on a two-way valve, and wherein the two-way valve is connected to a regulator through a connecting apparatus.

Next, an adapter 150 according to a second embodiment is shown in FIGS. 16 through 18. The same reference numerals have been provided for constituent elements that are the same as those of the adapter 20 for fluid pressure devices according to the first embodiment, and detailed explanations of such features shall be omitted.

The adapter 150 according to the second embodiment differs from the adapter 20 for fluid pressure devices according to the first embodiment, in that a seal member 154 is installed, via an annular groove, on the step 54 of the hole 36 of the base body (second body) 152, thereby enabling a fluidtight condition to be maintained between the base body 152 and the connecting plug (second connecting member) 42, which is stopped by engagement with the step 54.

As a result of such a structure, when the adapter 20 is connected to the port 28a of a fluid pressure device such as the two-way valve 14 or the like, leakage of pressure fluid that flows between the connecting plug 42 and the base body 152 can be prevented by the seal member 154, which is disposed between the large diameter portion 58 of the connecting plug 42 and the hole 36 of the base body 38.

That is, as shown in FIG. 18, even in the case that the seal member 86 of the connecting apparatus, which is connected to the adapter 150, abuts against the end surface of the connecting plug 42 but does not abut against the end surface of the base body 152, due to the radial inner dimension of the projections 48a', 48b' being greater than that of projections 48a, 48b, the seal member 154 is effective to prevent leakage of pressure fluid that passes between the connecting plug 42 (having small diameter portion 56') and the base body 152.

In other words, referring to the example of FIG. 18, the connector comprises a connecting apparatus 16 arranged between one and another of fluid pressure devices 12 and 14, the connecting apparatus comprising a first body 66 having a hole 65 defining a fluid passage communicating the fluid pressure devices 12 and 14, the connecting apparatus 16 comprising engaging portions 98a, 98b that face toward sides of the fluid pressure devices 12 and 14, and a seal member 86 in the hole. A second body 152 has projections 48a', 48b' with which the engaging portions 98a, 98b of the connecting apparatus 16 are engaged. A connecting member 42 is inserted through the second body 152, the connecting member having a hole 36 therein through which a pressure fluid flows and a screw section 56' that is screw-engaged with a port of one of said fluid pressure devices 14 through which pressure fluid is supplied and discharged. The connecting member 42 is mounted on said one (12) of the fluid pressure devices together with the second body 152 by screw-engagement of the connecting member 42 with the port. The seal member 86 of the connecting apparatus 16 abuts against an end surface of the connecting member 42 to prevent fluid leakage from the fluid passage. A first seal member 40 is disposed on the second body 152, which first seal member 40 abuts against an end surface of said one (12) of the fluid pressure devices on which the port opens. A second seal member 154 is disposed between the second body 152 and the connecting member 42 at a location that seals against fluid communication, through a flow path between the second body 152 and the connecting member 42, and between said one (12) of said fluid pressure devices and said connecting apparatus 16. The end surface of said one (12) of the fluid pressure devices is not in the flow path between the second body 152 and the connecting member 42, and between said one (12) of the fluid pressure devices and the connecting apparatus 16, that is sealed by the second seal member 154.

Figure 19:
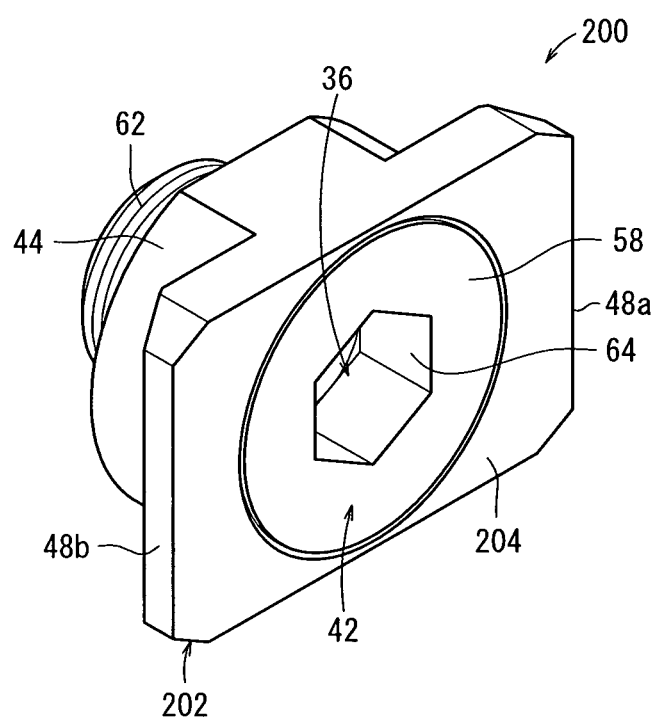
FIG. 19 is an exterior perspective view showing an adapter according to a third embodiment of the present invention.
Figure 20:
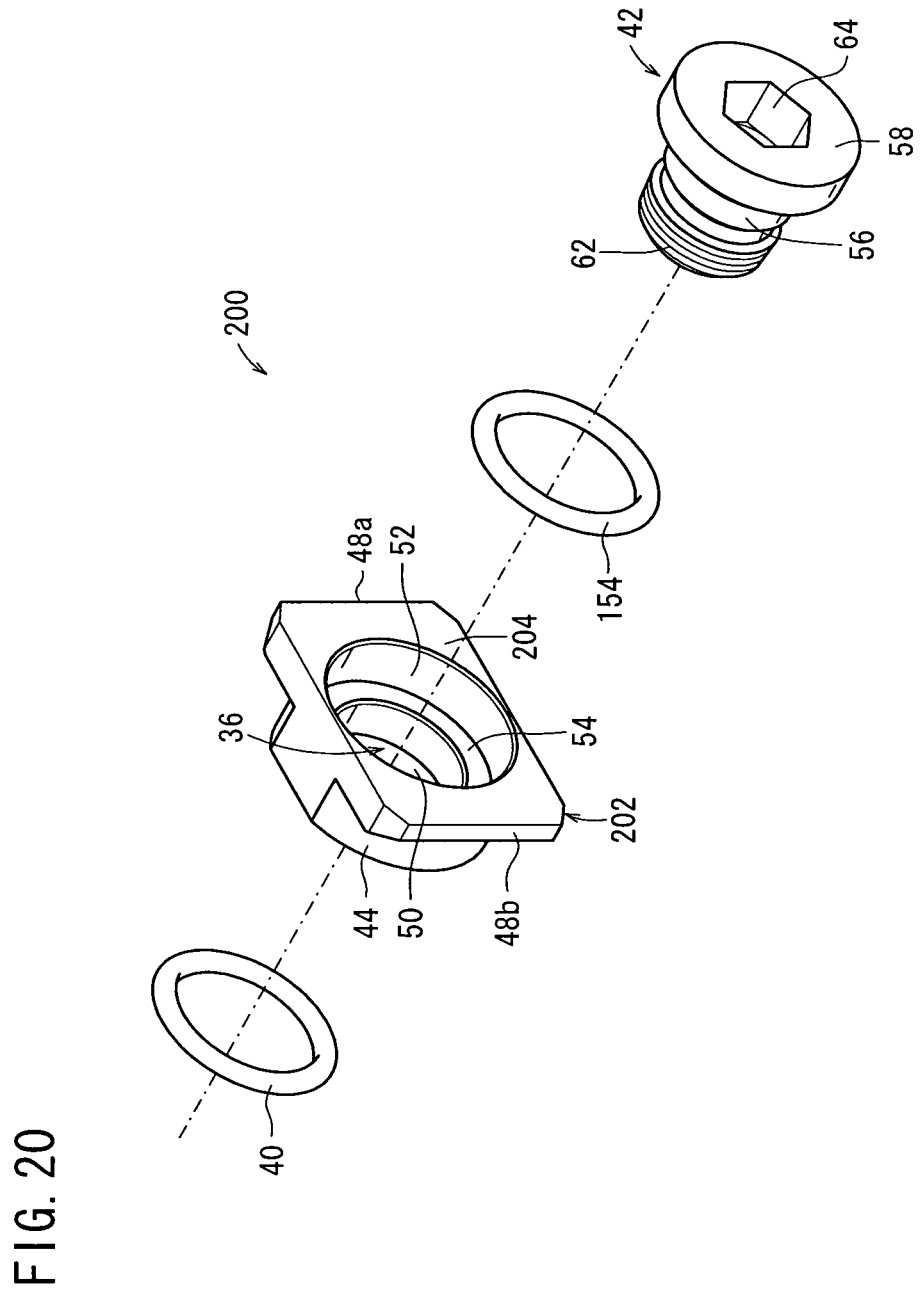
FIG. 20 is an exploded perspective view of the adapter shown in FIG. 19.

Next, an adapter 200 according to a third embodiment is shown in FIGS. 19 and 20. The same reference numerals have been provided for constituent elements that are the same as those of the adapters 20, 150 for fluid pressure devices according to the first and second embodiments, and detailed explanations of such features shall be omitted.

The adapter 200 according to the third embodiment differs from the adapter 150 for fluid pressure devices according to the second embodiment, in that the flange 204 that makes up the base body (body) 202 is formed in a rectangular shape. The pair of coupling members 48a, 48b on the flange 204 that are connected to the connecting apparatus 16 are separated a predetermined distance from the cylindrical portion 44, and the region perpendicular to the coupling members 48a, 48b is formed with a width dimension, which is smaller than the outer diameter of the cylindrical portion 44.

By means of such a structure, since the height dimension of the adapter 20 can be suppressed, this configuration is suitable for cases that are constrained by installation conditions of the fluid pressure devices to which the adapter 200 is connected, and the fluid pressure unit including the fluid pressure devices can be made smaller in height.

Further, in the above-described embodiments, the adapters 20, 20a, 150, 200 have been described for cases in which they are installed with respect to two-way valves 14, 14a. However, the invention is not limited to this configuration. For example, in place of the two-way valves 14 and 14a, such adapters may also be installed onto a throttle valve, which is capable of controlling the flow amount of a pressure fluid, or a manually operated valve or the like. That is, any fluid pressure device having a port into which the connecting plug 42 that constitutes the adapters 20, 20a, 150, 200 can be threaded and screw-engaged therewith is acceptable.

Furthermore, the connecting apparatus, which is connected with respect to the adapters 20, 20a, 150, 200, is not limited to one equipped with the structure used in the aforementioned embodiments, so long as the connecting apparatus includes connecting flanges that are capable of engagement with the coupling members 18a, 18b, 48a, 48b of the adapters 20, 20a, 150, 200.

The connector for fluid pressure devices according to the present invention is not limited to the above-described embodiments, and various other structures may be adopted as a matter of course, which do not deviate from the essential nature and gist of the present invention.

The invention claimed is:

1. A connector connecting fluid pressure devices, comprising:
   a connecting apparatus arranged between one and another of fluid pressure devices, the connecting apparatus comprising a first body having a hole defining a fluid passage communicating the fluid pressure devices, said connecting apparatus comprising engaging portions that face toward sides of said fluid pressure devices, and a seal member in said hole;
   a second body having projections with which the engaging portions of said connecting apparatus are engaged;
   a connecting member inserted through said second body to provide a joint between said second body and said connecting member, the joint extending from said one of said fluid pressure devices to said connecting apparatus, the connecting member having a hole therein through which a pressure fluid flows and a screw section that is screw-engaged with a port of one of said fluid pressure devices through which said pressure fluid is supplied and discharged, wherein said connecting member is mounted on said one of said fluid pressure devices together with said second body by screw-engagement of said connecting member with said port, and wherein the seal member is provided in the hole of the connecting apparatus;
   wherein the second body and connecting member respectively have at least one dimension in the radial direction of said hole such that the seal member in the hole of the connecting apparatus does not abut against the end surface of the second body and does not seal said joint between the connecting member and the second body;
   a first seal member disposed on said second body that is engaged with the engaging portions of said connecting apparatus, which first seal member abuts against an end surface of said one of said fluid pressure devices on which said port opens to seal a first flow path provided between the end surface of said one of said fluid pressure devices and said second body; and
   a second seal member disposed between said second body and said connecting member being screw-engaged with the port of the one of said fluid pressure devices, at a location that seals against fluid communication through a second flow path provided at the joint between said second body and said connecting member, and between said one of said fluid pressure devices and said connecting apparatus,
   wherein the end surface of said one of said fluid pressure devices is not in the flow path between said second body and said connecting member, and between said one of said fluid pressure devices and said connecting apparatus, that is sealed by said second seal member, whereby the second seal member does not seal the first flow path, and wherein the first seal member does not seal the second flow path.

* * * * *